(12) United States Patent
Rimboym et al.

(10) Patent No.: US 12,372,985 B2
(45) Date of Patent: Jul. 29, 2025

(54) MONITOR CONTROL VALVE WITH BACKFLOW PREVENTION

(71) Applicant: VRG Controls LLC, Lake Zurich, IL (US)

(72) Inventors: Vladimir Rimboym, Highland Park, IL (US); James M. Garvey, Wheaton, IL (US)

(73) Assignee: VRG Controls, LLC, Lake Zurich, IL (US)

( * ) Notice: Subject to any disclaimer, the term of this patent is extended or adjusted under 35 U.S.C. 154(b) by 16 days.

(21) Appl. No.: 18/416,609

(22) Filed: Jan. 18, 2024

(65) Prior Publication Data

US 2024/0241525 A1    Jul. 18, 2024

Related U.S. Application Data

(63) Continuation-in-part of application No. 17/453,731, filed on Nov. 5, 2021, now abandoned.

(60) Provisional application No. 63/110,522, filed on Nov. 6, 2020.

(51) Int. Cl.
    *G05D 7/06* (2006.01)
    *G05D 16/00* (2006.01)

(52) U.S. Cl.
    CPC ......... *G05D 7/0629* (2013.01); *G05D 16/024* (2019.01); *G05D 16/028* (2019.01)

(58) Field of Classification Search
    CPC ........... Y10T 137/776; Y10T 137/7762; Y10T 137/7769; Y10T 137/777; Y10T 137/7796; G05D 16/024; G05D 16/028; G05D 7/0629; G05D 7/0647; F17D 3/01

USPC ............... 137/487, 488, 492, 492.5, 505.13
See application file for complete search history.

(56) References Cited

U.S. PATENT DOCUMENTS

| | | | | |
|---|---|---|---|---|
| 2,543,846 | A * | 3/1951 | Griswold | F16K 17/105 137/488 |
| 2,731,032 | A * | 1/1956 | Hughes | G05D 16/0655 251/28 |
| 3,951,568 | A * | 4/1976 | Carlson, Jr. | F04B 49/22 417/27 |
| 3,977,423 | A * | 8/1976 | Clayton | G05D 16/166 137/487 |
| 4,250,913 | A * | 2/1981 | Scull | F16K 31/385 137/116.5 |
| 4,301,831 | A * | 11/1981 | Lord | G05D 16/163 137/487 |
| 4,537,364 | A * | 8/1985 | Pollman | B65H 75/4489 242/390.5 |
| 4,705,065 | A * | 11/1987 | McNeely | F16K 17/10 92/48 |
| 5,341,839 | A * | 8/1994 | Kobayashi | E03D 5/10 137/614.19 |
| 5,348,036 | A * | 9/1994 | Oksanen | G05D 7/03 137/489.5 |

(Continued)

*Primary Examiner* — William M McCalister
(74) *Attorney, Agent, or Firm* — Bishop & Diehl, Ltd.

(57) ABSTRACT

A gas supply line control system and method for preventing flow reversal due to an upstream pressure drop in a natural gas supply line, the system and method include setting a threshold low pressure for the upstream gas flow, continually sensing the upstream pressure, activating a trigger valve when the upstream pressure falls below the threshold low pressure, and closing a control valve in response to the trigger valve to prevent reversal of flow in the gas supply line.

6 Claims, 11 Drawing Sheets

(56) References Cited

U.S. PATENT DOCUMENTS

| | | | | |
|---|---|---|---|---|
| 5,660,198 A * | 8/1997 | McClaran | | G05D 16/106 137/12 |
| 5,738,333 A * | 4/1998 | Cognevich | | F16K 17/105 137/489.5 |
| 6,035,878 A * | 3/2000 | Adams | | G05D 16/2095 137/12 |
| 6,363,958 B1 * | 4/2002 | Ollivier | | G05D 16/0661 137/486 |
| 7,770,612 B1 * | 8/2010 | Brown | | B60P 7/065 141/10 |
| 10,503,181 B2 * | 12/2019 | Young | | G05D 16/2095 |
| 11,137,781 B2 * | 10/2021 | Masias | | F16K 17/10 |
| 2002/0036013 A1 | 3/2002 | Inayama | | G05D 16/2024 137/487.5 |
| 2004/0261857 A1 * | 12/2004 | Webster | | E21B 43/01 137/487.5 |
| 2005/0173003 A1 * | 8/2005 | Laverdiere | | G05D 16/2013 137/487.5 |
| 2008/0023662 A1 * | 1/2008 | Reinicke | | F16K 15/1823 251/58 |
| 2008/0185051 A1 * | 8/2008 | Warnick | | F15B 11/028 137/488 |
| 2008/0251130 A1 * | 10/2008 | Folk | | G05D 16/163 137/489.5 |
| 2009/0248210 A1 * | 10/2009 | Arenas | | G05D 16/2095 700/282 |
| 2010/0071787 A1 * | 3/2010 | Folk | | F16K 31/365 137/625.61 |
| 2011/0297246 A1 * | 12/2011 | Radosevic | | B61D 45/006 137/224 |
| 2013/0092259 A1 * | 4/2013 | Griffin, Jr. | | F15B 11/08 137/485 |
| 2013/0153062 A1 * | 6/2013 | Young | | F23N 1/002 137/557 |
| 2014/0150874 A1 * | 6/2014 | Garvey | | F16K 17/105 137/627.5 |
| 2014/0182694 A1 * | 7/2014 | Cheron | | G05D 16/166 137/12 |
| 2015/0114492 A1 * | 4/2015 | Oksanen | | G05D 7/03 137/487 |
| 2016/0356389 A1 * | 12/2016 | Masias | | G05D 16/163 |
| 2019/0072194 A1 * | 3/2019 | Masias | | G05D 16/16 |
| 2020/0209898 A1 * | 7/2020 | Quan | | F15B 13/0416 |
| 2021/0116045 A1 * | 4/2021 | Garvey | | F16K 17/105 |
| 2022/0146052 A1 * | 5/2022 | Rimboym | | F17D 3/01 |

* cited by examiner

MONITOR CONTROL VALVE WITH BACKFLOW PREVENTION

RELATED APPLICATION

The present application is a continuation-in-part of U.S. patent application Ser. No. 17/453,731 titled "Monitor Control Valve With Backflow Prevention" filed on Nov. 5, 2021, which claims the filing priority of U.S. Provisional Application No. 63/110,522, titled "Monitor Control Valve with Backflow Prevention" and filed on Nov. 6, 2020. The '731 application and the '522 application are hereby incorporated by reference.

TECHNICAL FIELD OF THE INVENTION

The present invention relates to control systems. More specifically, the invention relates to flow and pressure control systems for natural gas lines.

BACKGROUND OF THE INVENTION

In current natural gas line control systems, a significant drop in upstream or supply side pressure (P1) creates a potential backflow from the downstream or delivery side natural gas lines. This is an extremely undesirable occurrence. To prevent such a backflow condition, a backflow prevention valve—i.e., a check valve—is usually installed into the gas line upstream of the control valve (See FIG. 1). This is a costly undertaking for natural gas suppliers and requires annual maintenance and certification of operation.

A significant upstream pressure drop (abnormal operating condition) is typically the result of a pipeline rupture or other significant event causing an upstream loss of gas. Normal upstream pressure is between 230 to 500 psig, while downstream pressure is generally maintained by regulators at 160 psig.

The use of a Monitor Control Valve has been used by the Assignee of this invention, VRG Controls, LLC., for many years as a way of providing "over-pressure" protection in a natural gas pipeline. FIG. 2 illustrates a normal gas flow where P2 is less than P1 due to pressure reduction maintained by a worker regulator 20. As illustrated in FIG. 2, a monitor regulator 22 positioned upstream of the worker regulator 20 is in standby mode during normal operation. As shown in FIG. 3, the monitor regulator 22 takes over to throttle gas flow when the downstream pressure at P2 begins to exceed 160 psig. The onset of this over-pressure condition is often due to a failure of the worker regulator 20. In the event of an upstream rupture, as illustrated in FIG. 4, pressure at P1 drops significantly due to the loss of gas. When the pressure at P1 falls below pressure at P2, a reverse flow scenario is created. The worker regulator 20 and monitor regulator 22 cannot act to prevent the reverse flow, leading to a significant loss of product, loss of revenue, and unsafe conditions due to release of flammable media to atmosphere.

Unfortunately, the potential occurrence of flow reversal in a natural gas line has only been addressed by the addition of a backflow prevention valve—i.e., a check valve. The gas line arrangement illustrated in FIGS. 5-7 shows a typical check valve 24 positioned upstream of the two regulators, 20 and 22. FIG. 5 shows normal gas line conditions, where P2 is less than P1 and gas flow is regulated by the worker regulator 20. FIG. 6 illustrates a worker regulator failure, causing the monitor regulator 22 to take control of pressure regulation, much like the system of FIG. 3 explained above.

In neither of these two scenarios does the check valve 24 interrupt flow. However, FIG. 7 illustrates a pipeline rupture upstream causing a drop of pressure at P1. The loss of pressure at P1 is almost immediate, but the check valve 24 will only close when the P1 pressure falls to or below P2 pressure. This equalization can take time after the occurrence of a line rupture.

Accordingly, a failsafe system is needed which can address both an over-pressure scenario as well as a reverse flow scenario in a gas line. Further, a failsafe system possesses an adjustable setpoint capable of responding to an upstream pressure drop well before pressure equalization is also desirable. This feature lessens the volume of gas lost to atmosphere in the event of a flow reversal due to rupture of the pipeline which benefits safety and lessens the potential of undersupplying gas consumers downstream of the pipeline rupture. Finally, a failsafe system which, unlike a check valve, is not costly to install and costly to maintain is most desirable.

Until the invention of the present application, these and other problems in the prior art went either unnoticed or unsolved by those skilled in the art. The present invention provides a system control for gas lines which performs multiple functions with associated devices potentially without requiring expensive retrofitting of valves in existing gas lines.

SUMMARY OF THE INVENTION

There is disclosed herein an improved natural gas line control system and methods which avoid the disadvantages of prior devices, systems and methods while affording additional structural and operating advantages.

Currently, a monitor control valve provides overpressure protection on pipeline. This means that if the "worker" (primary) control valve fails, then the monitor control valve takes control limiting downstream pressure. However, the disclosed monitor control valve system is altered to now include a "flow reversal prevention" feature which prevents reversal of flow if upstream pressure drops to predetermined setpoint. Addition of an upstream pressure sensor and trigger valve to prevent "flow reversal" is a new combination. The configuration eliminates the need for a customer to install a separate check valve component in the pipeline to prevent "flow reversal." The system may incorporate almost any type of control valve that can exhibit flow shutoff and has a mechanically actuated system that will guarantee closure of the valve upon loss of pneumatic supply pressure.

Generally speaking, the gas supply line control system comprises a control valve having an inlet, an outlet, and a mechanism for moving between an open and closed position to control gas flow from the inlet to the outlet, wherein gas flows from upstream to the inlet, to downstream through the outlet, a pressure sensor for determining an upstream side line pressure, and a trigger valve responsive to the pressure sensor for operating the control valve. The trigger valve closes the control valve mechanism when the pressure sensor determines an upstream pressure below a predetermined value to prevent reverse flow of gas.

The gas supply line control system work with one of almost any type of control valve that can exhibit flow shutoff and has a mechanically actuated system that will guarantee closure of the valve upon loss of pneumatic supply pressure.

A method for preventing flow reversal due to an upstream pressure drop in a natural gas supply line, the method comprising setting a threshold low pressure for the upstream gas line, continually sensing the upstream pressure, activating a trigger valve when the upstream pressure falls below the threshold low pressure, and closing a control valve in response to the trigger valve to prevent reversal of flow in the gas supply line.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
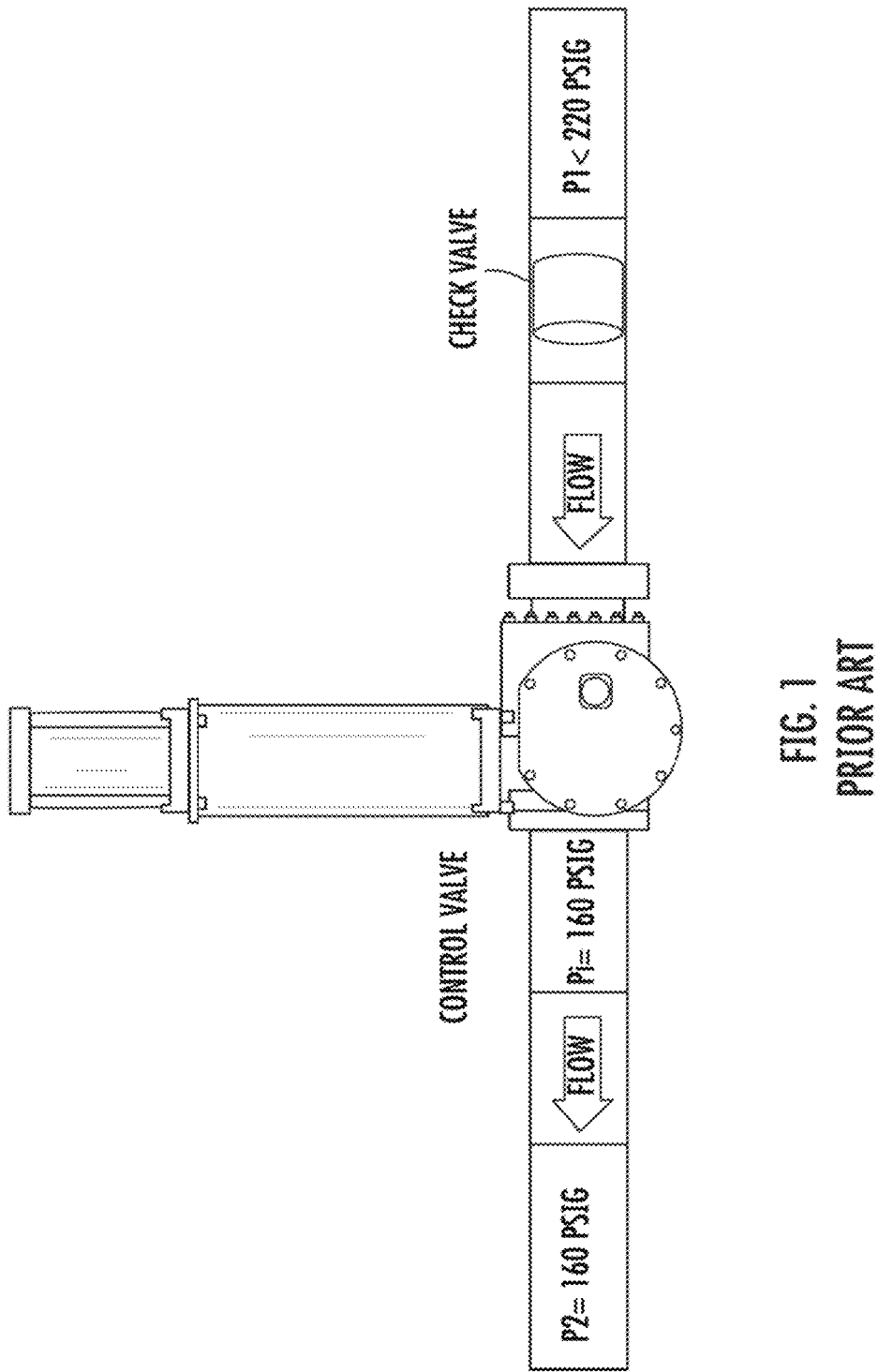
FIG. 1 is a schematic showing a prior art approach which splices a check valve into a gas line upstream of flow control regulators to prevent reverse flow in the event of a line rupture.
Figure 2:
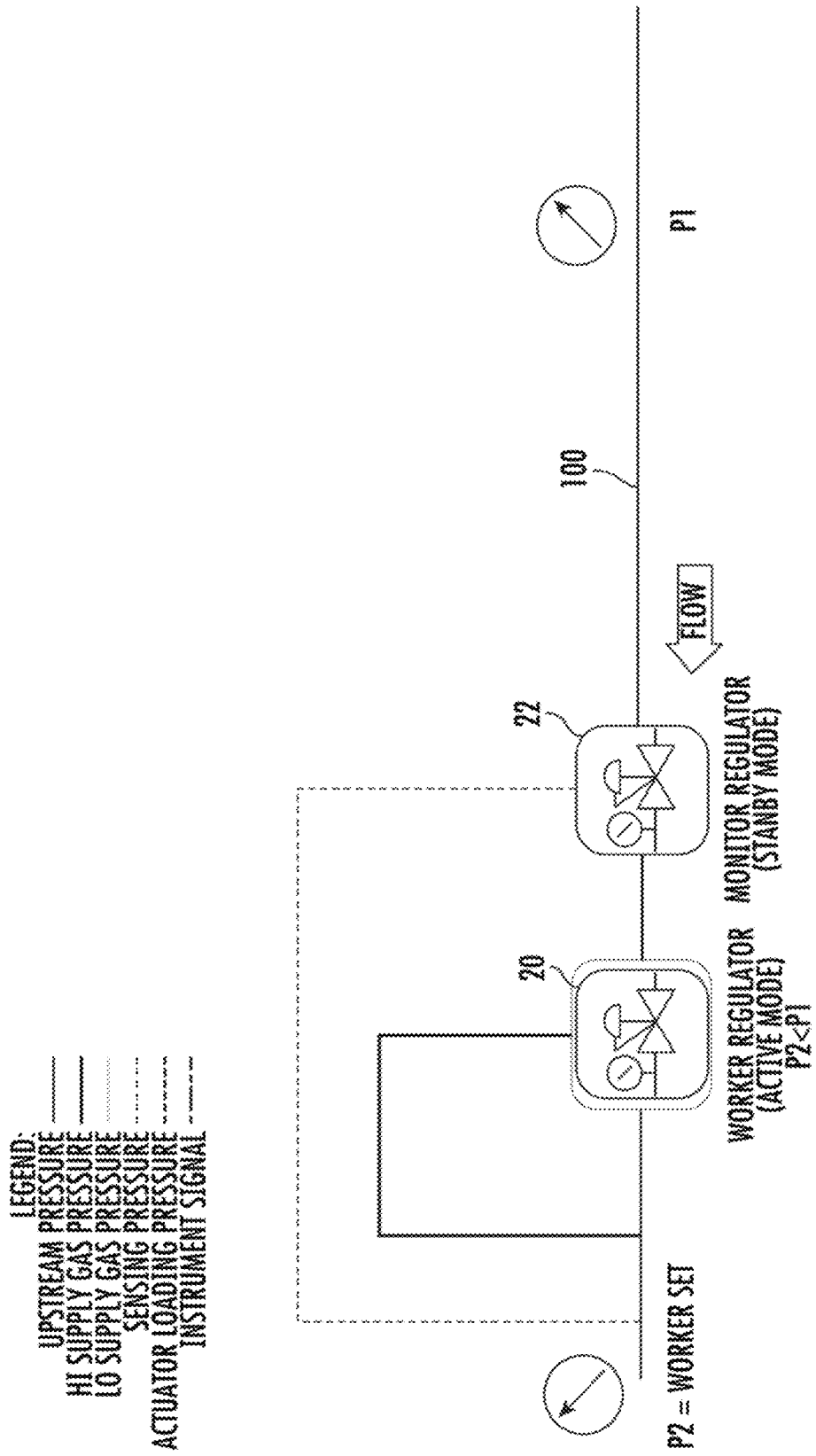
FIG. 2 is a schematic showing normal operation of a standard prior art gas line regulation system with a worker regulator and an upstream monitor regulator-worker control valve in control.
Figure 3:
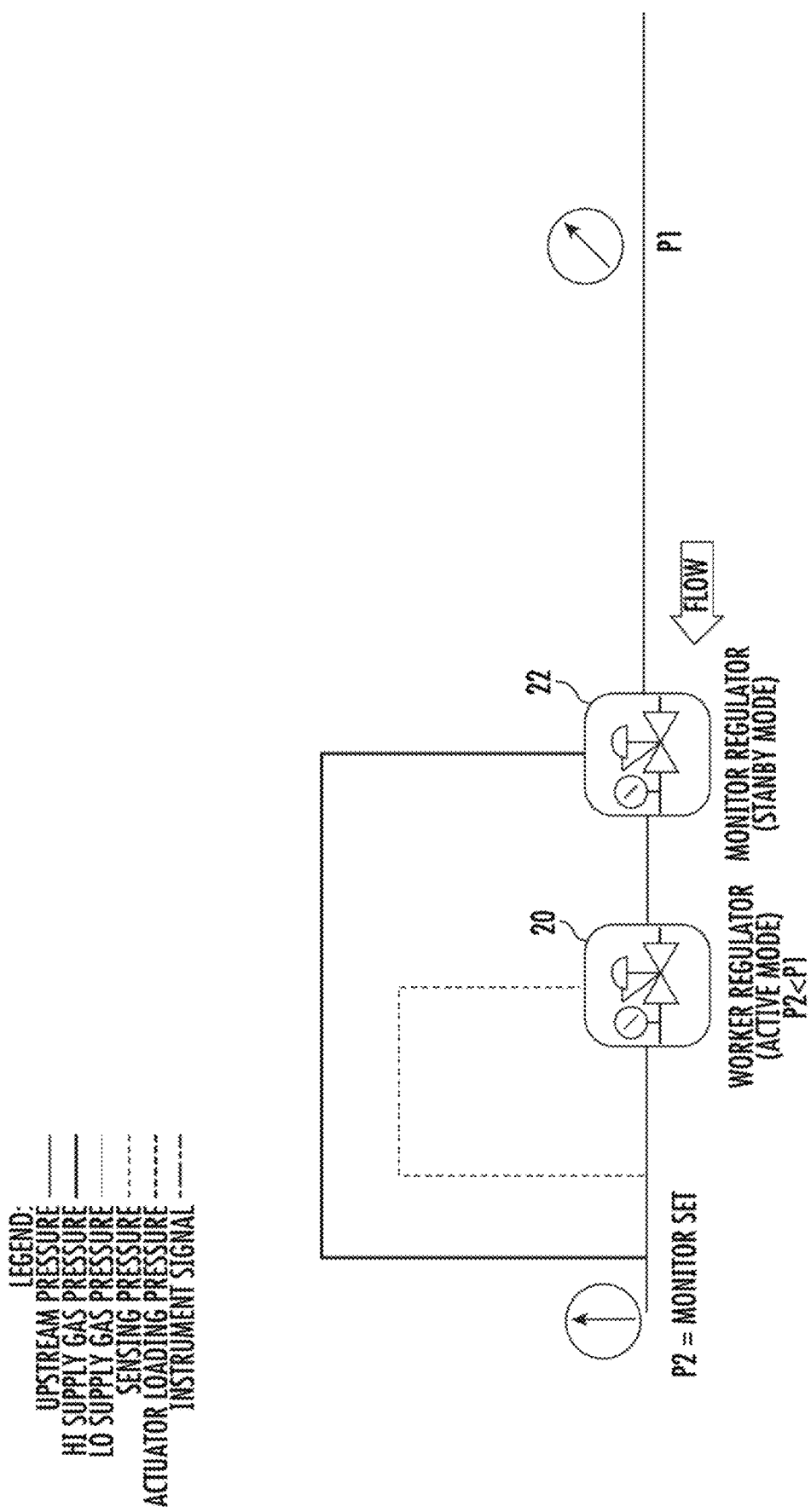
FIG. 3 is a schematic showing operation of a standard prior art gas line regulation system with a worker regulator and an upstream monitor regulator after failure of a worker regulator and activation of the monitor regulator.
Figure 4:
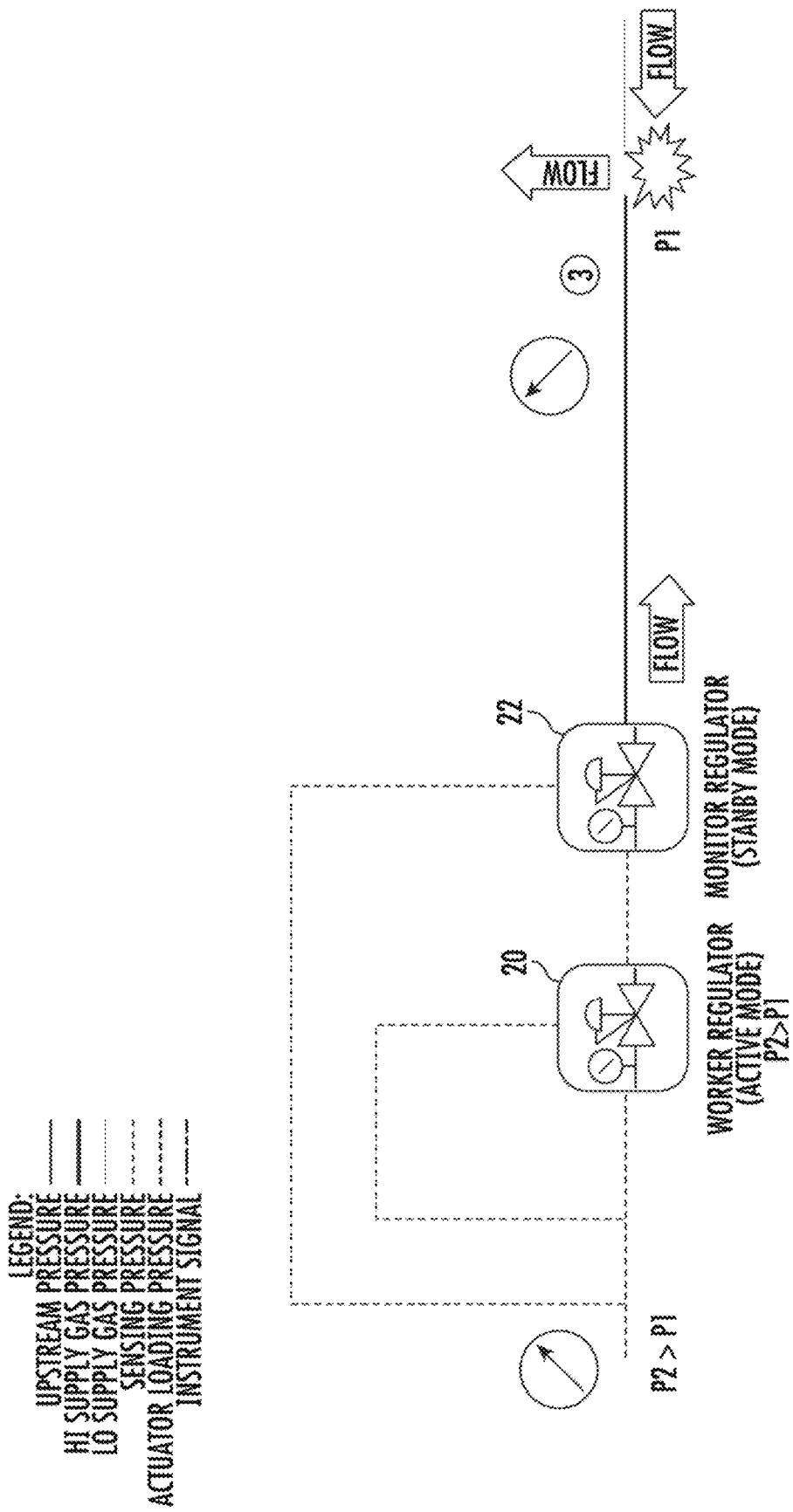
FIG. 4 is a schematic showing operation of a standard prior art gas line regulation system with a worker regulator and an upstream monitor regulator after a gas line rupture upstream.
Figure 5:
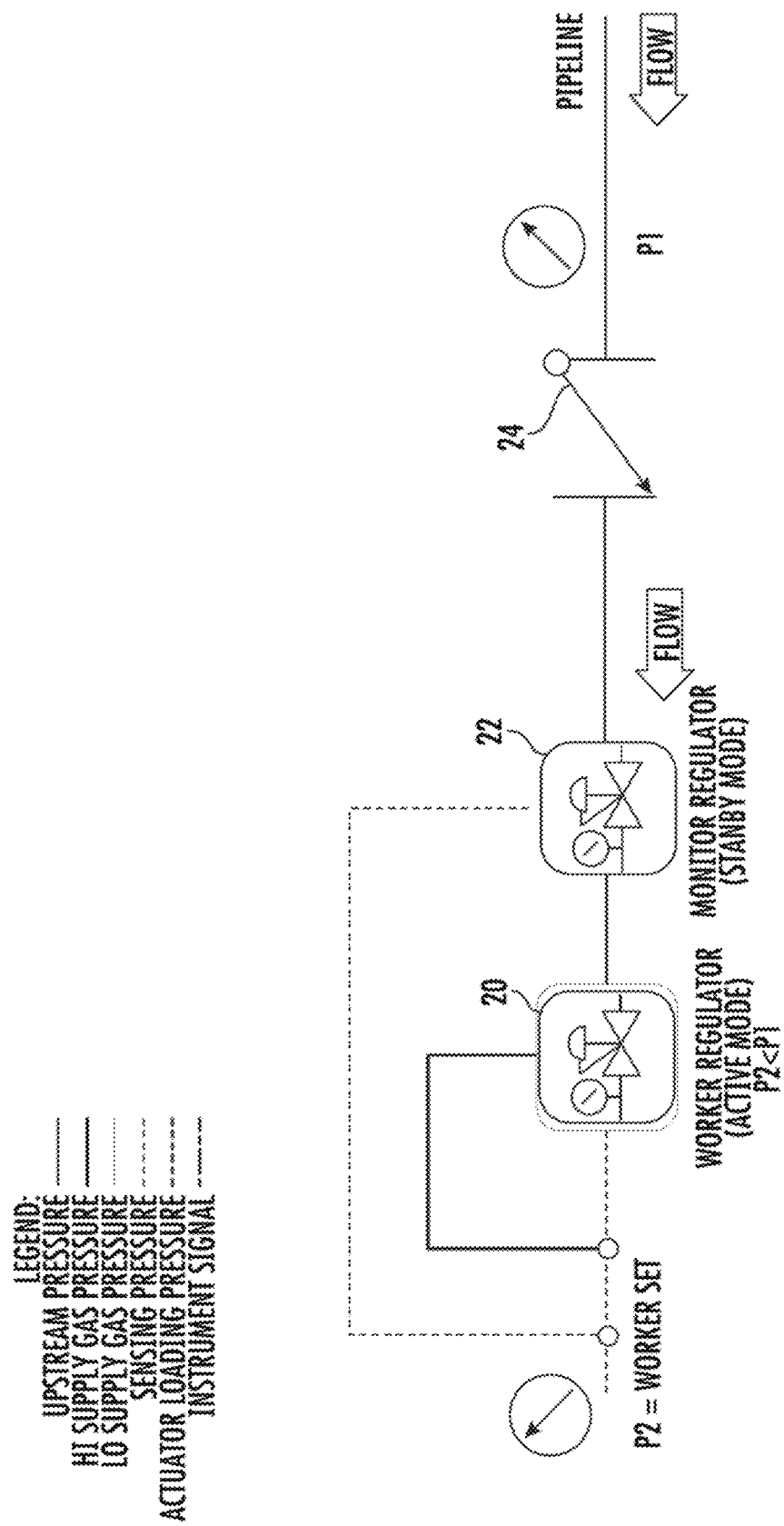
FIG. 5 is a schematic showing normal operation of a standard prior art gas line regulation system with a worker regulator and an upstream monitor regulator having an upstream check valve-worker valve in control.
Figure 6:
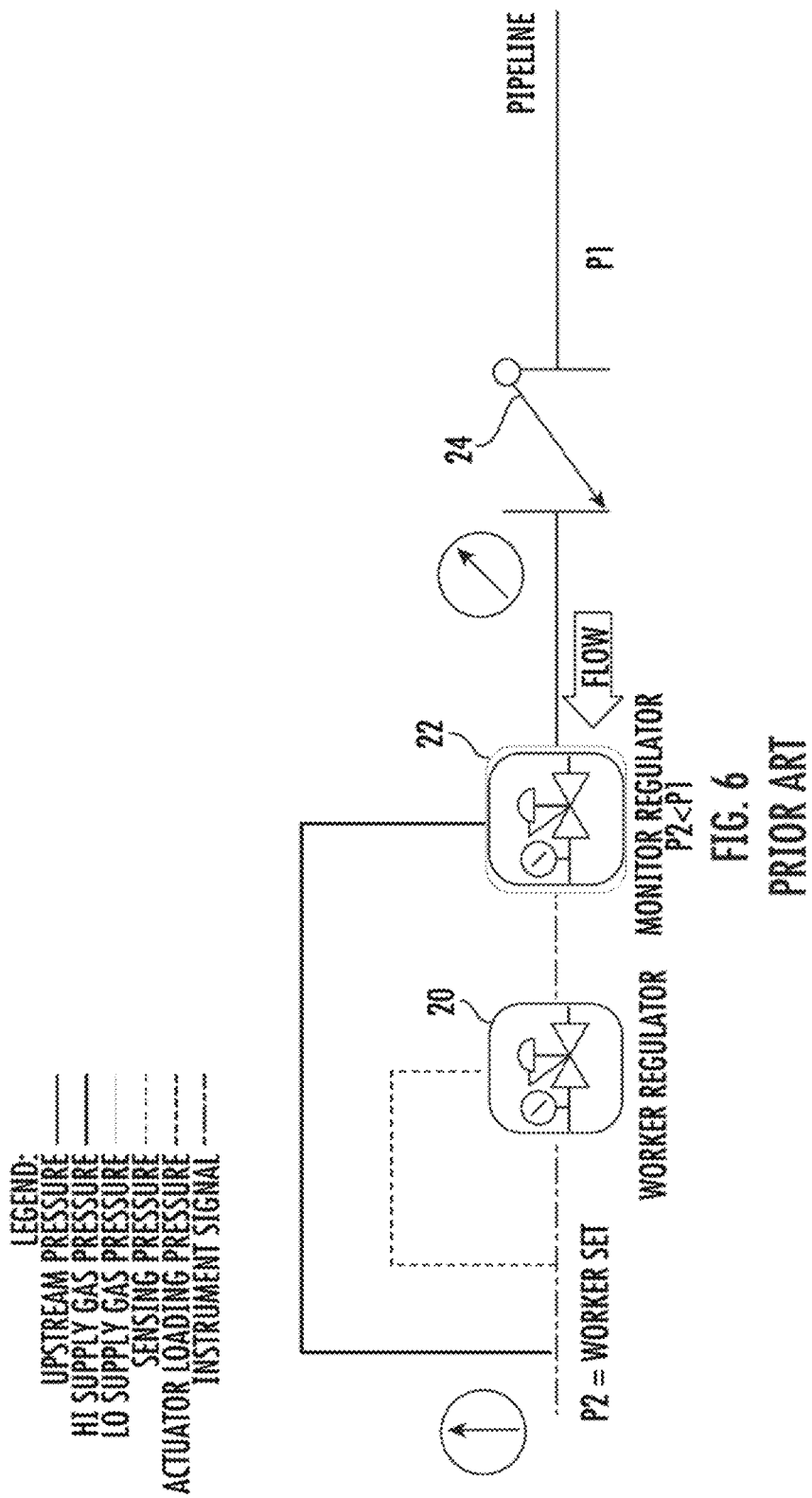
FIG. 6 is a schematic of the system of FIG. 5 showing operation after failure of the worker regulator-monitor valve in control.
Figure 7:
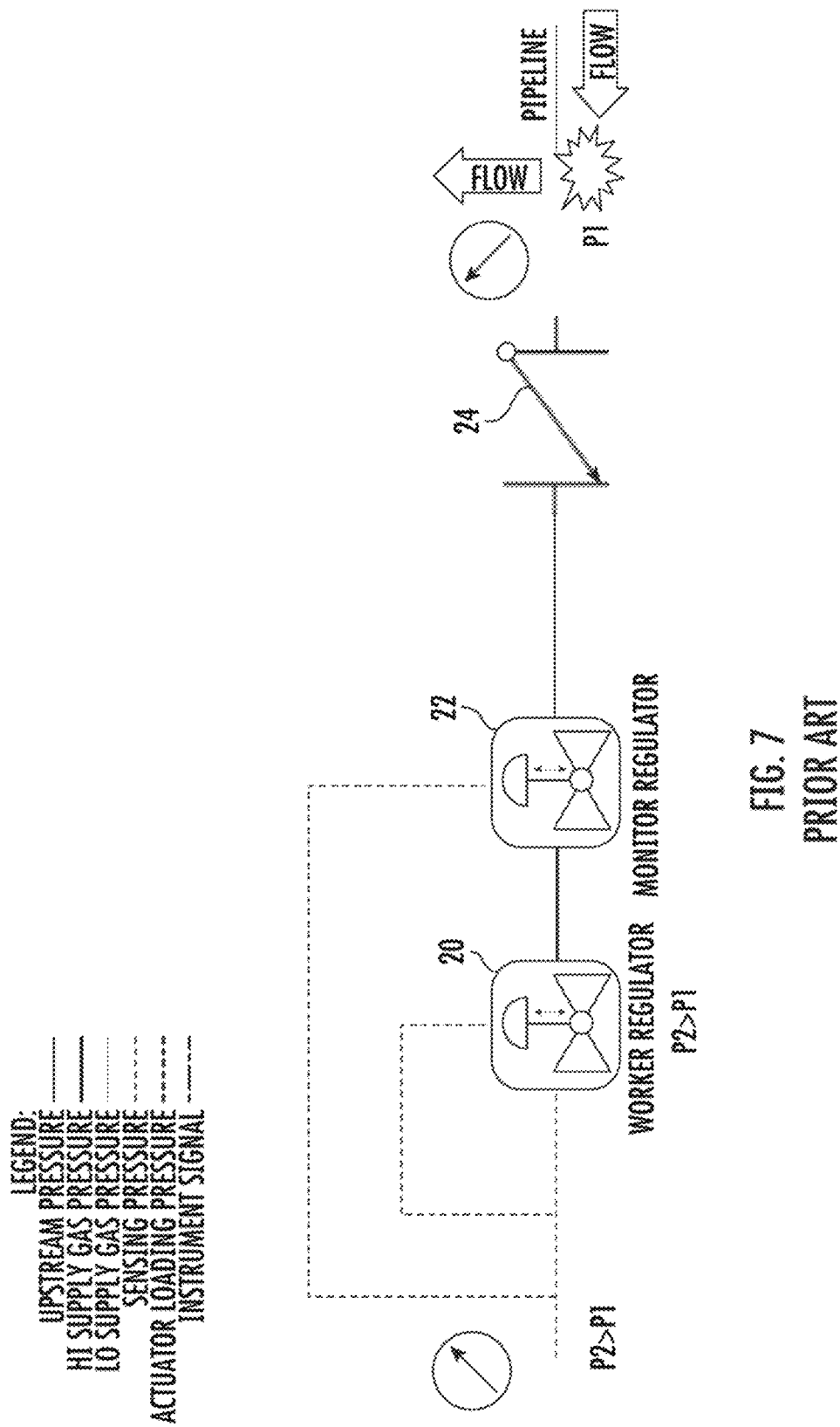
FIG. 7 is a schematic of the system of FIG. 5 showing operation after a pipeline rupture upstream-check valve engaged to prevent flow reversal.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

A schematic of the prior art use of a check valve 24 to prevent flow reversal in a gas line 100 is illustrated in FIGS. 1 and 5-7. The addition of the check valve 24 is a time-consuming and costly undertaking requiring annual maintenance. The issue of flow reversal is more readily addressed by the present invention, which adds upstream pressure sensing and valve control to an existing control valve system.

Figure 8:
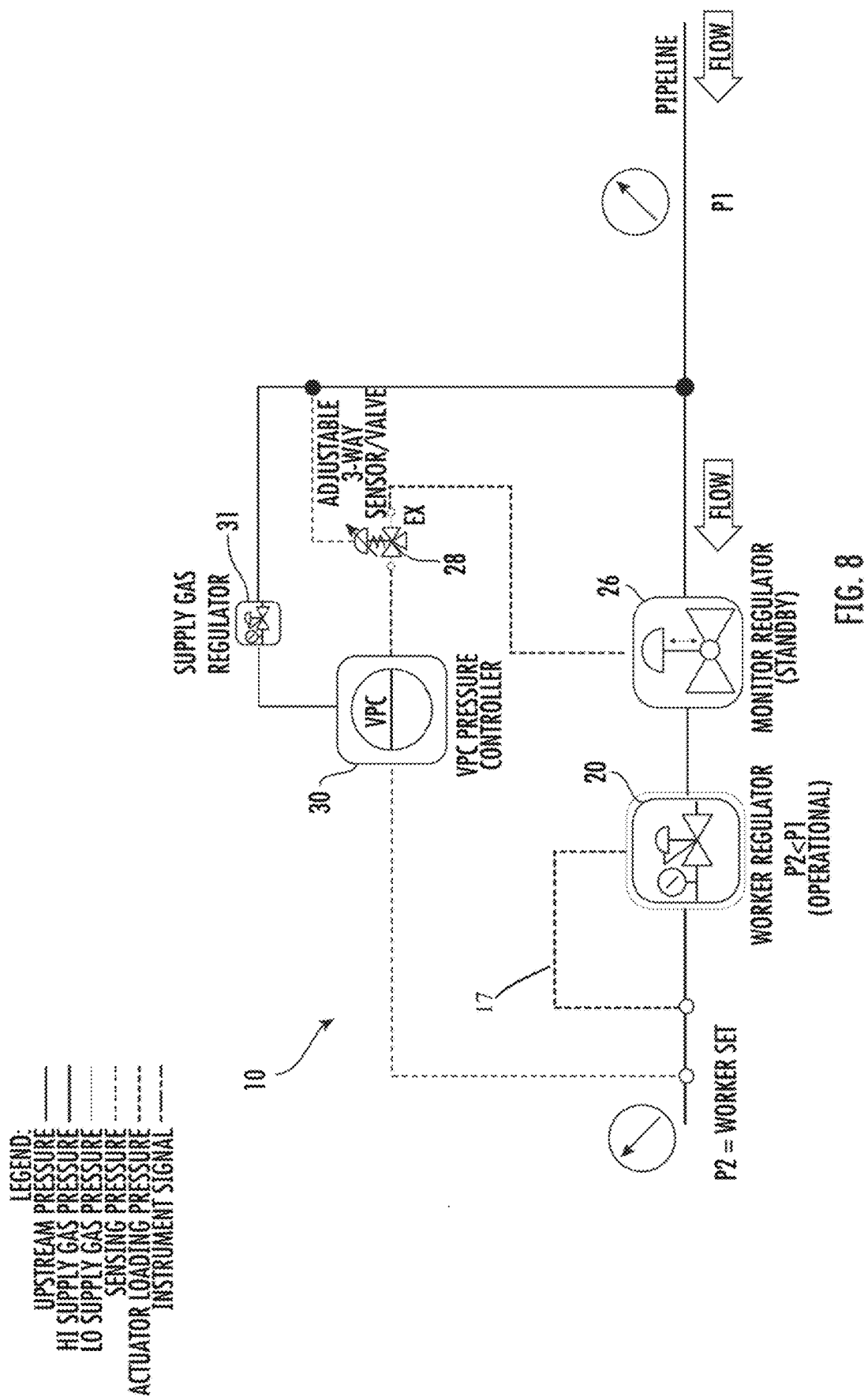
FIG. 8 is an operational schematic showing normal operation of an embodiment of the disclosed gas line regulation system-worker valve in control.

Referring to FIG. 8, operational parameters of the disclosed system are shown. The schematic of FIG. 8 is simplified for a general understanding of operation, as some actual components may be combined. The illustrated embodiment is directed to a control system 10 for a natural gas supply line 100. The particular illustrated supply line 100 has a preferred upstream pressure (P1) in the range of 230 to 500 psig, while the downstream preferred pressure (P2) is 160 psig. Obviously, other set points for P1 and P2 pressures would be similarly addressed by the disclosed system 10. Generally speaking, the control system 10 comprises a worker regulator valve 20, a monitor control valve 26, and a pressure controller (or valve pilot controller (VPC)) 30 with pressure sensing capabilities both upstream (P1) and downstream (P2). The monitor control valve 26 has an inlet side (upstream), an outlet side (downstream), and is controlled by trigger valve 28 via the pressure controller 30. In the illustrated embodiment of FIGS. 9-11, the trigger valve 28 is also coupled to an upstream pressure sensor 31. Operationally, the monitor control valve 26 has a "full-open" default position, which can be (1) unchanged by the trigger valve 28, (2) throttled via loading pressure from the trigger valve 28 in response to the controller 30 sensing increased P2, and (3) closed via loading pressure from the trigger valve 28 in response to pressure sensor 31 sensing decreasing P1 (below minimum setpoint).

Figure 9:
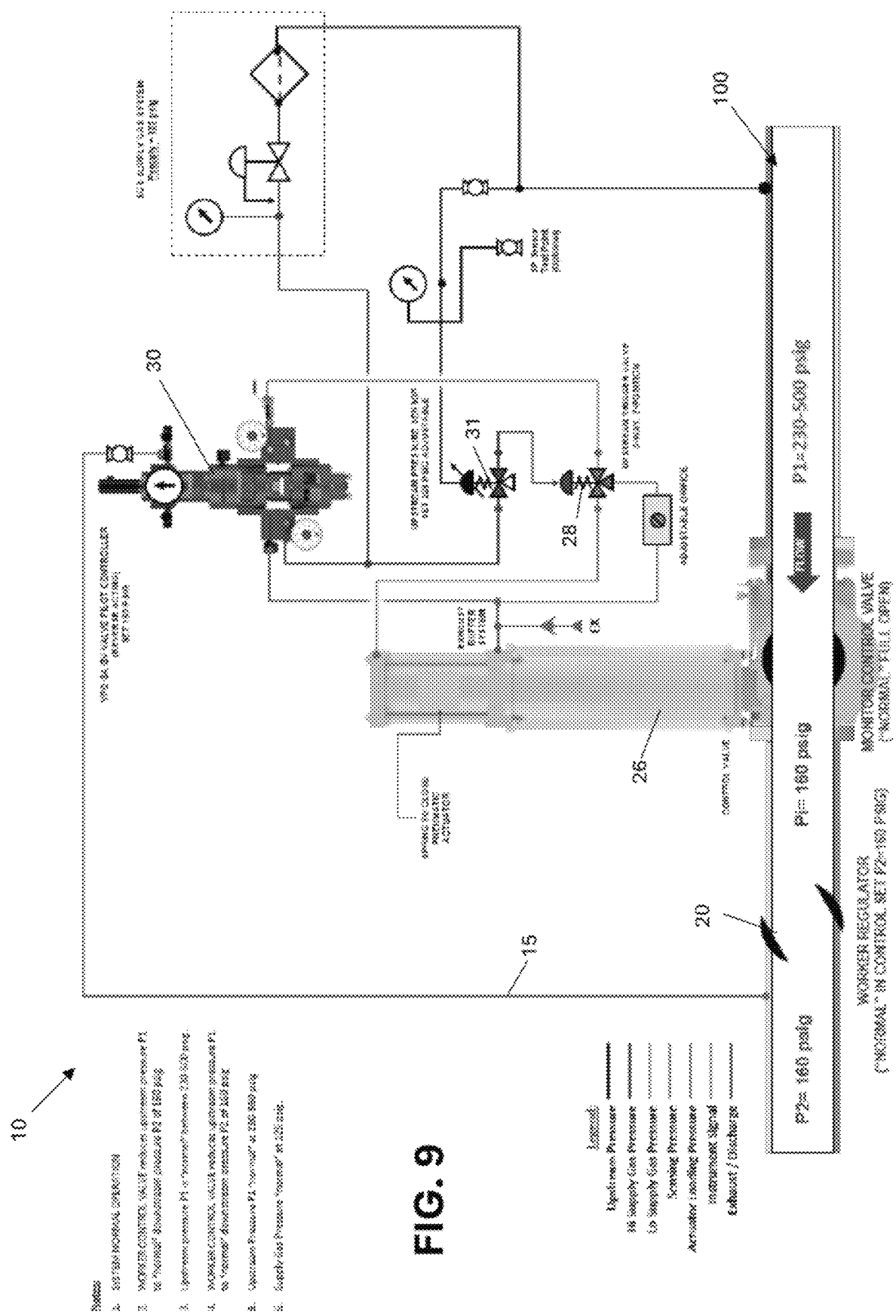
FIG. 9 illustrates an embodiment of the disclosed control system during normal operation with a worker regulator controlling flow and a monitor control valve in a full-open position.
Figure 10:
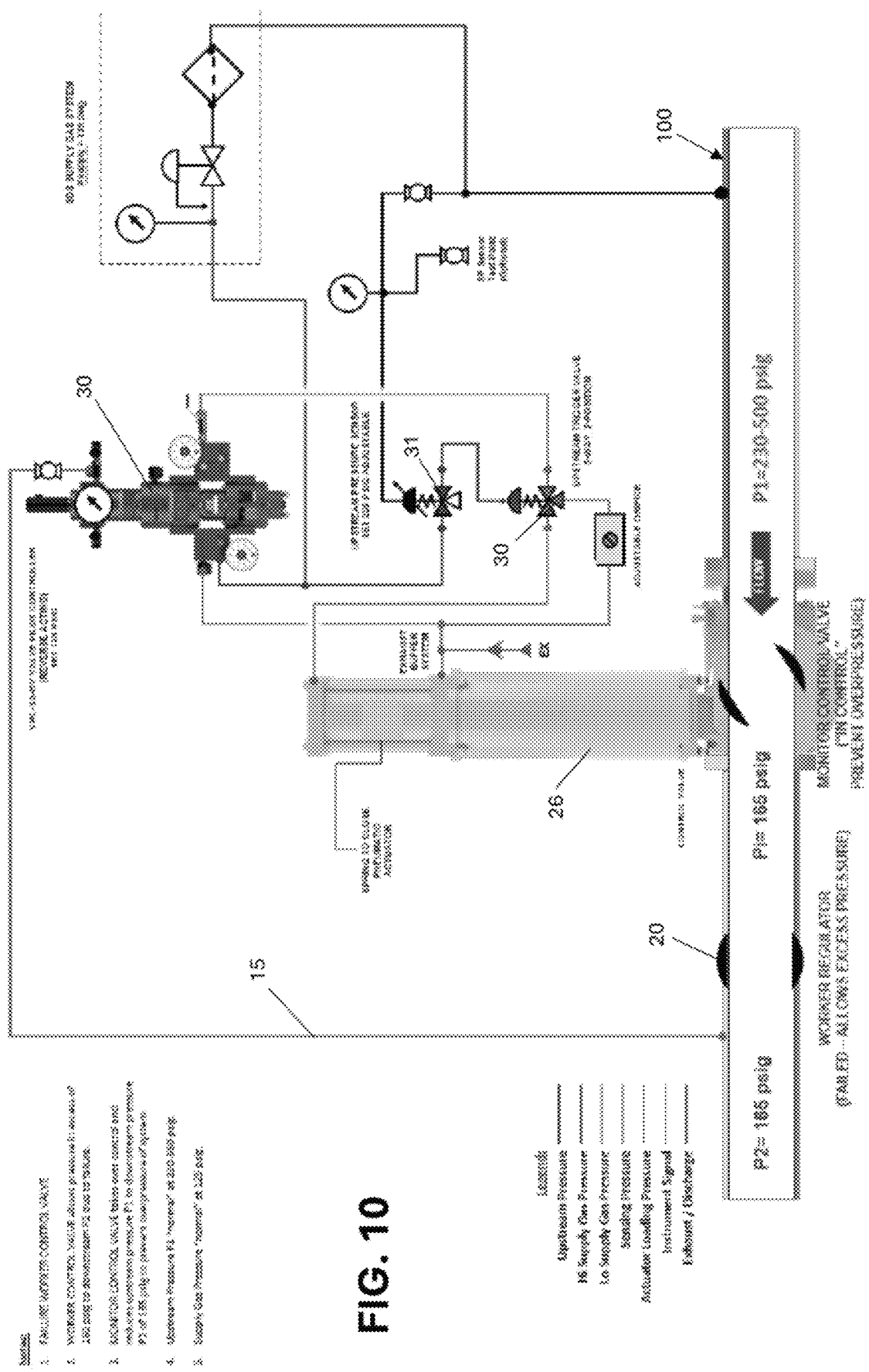
FIG. 10 illustrates the system of FIG. 9 showing operational changes after failure of the worker regulator with overpressure prevention logic of the monitor control valve throttling flow.
Figure 11:
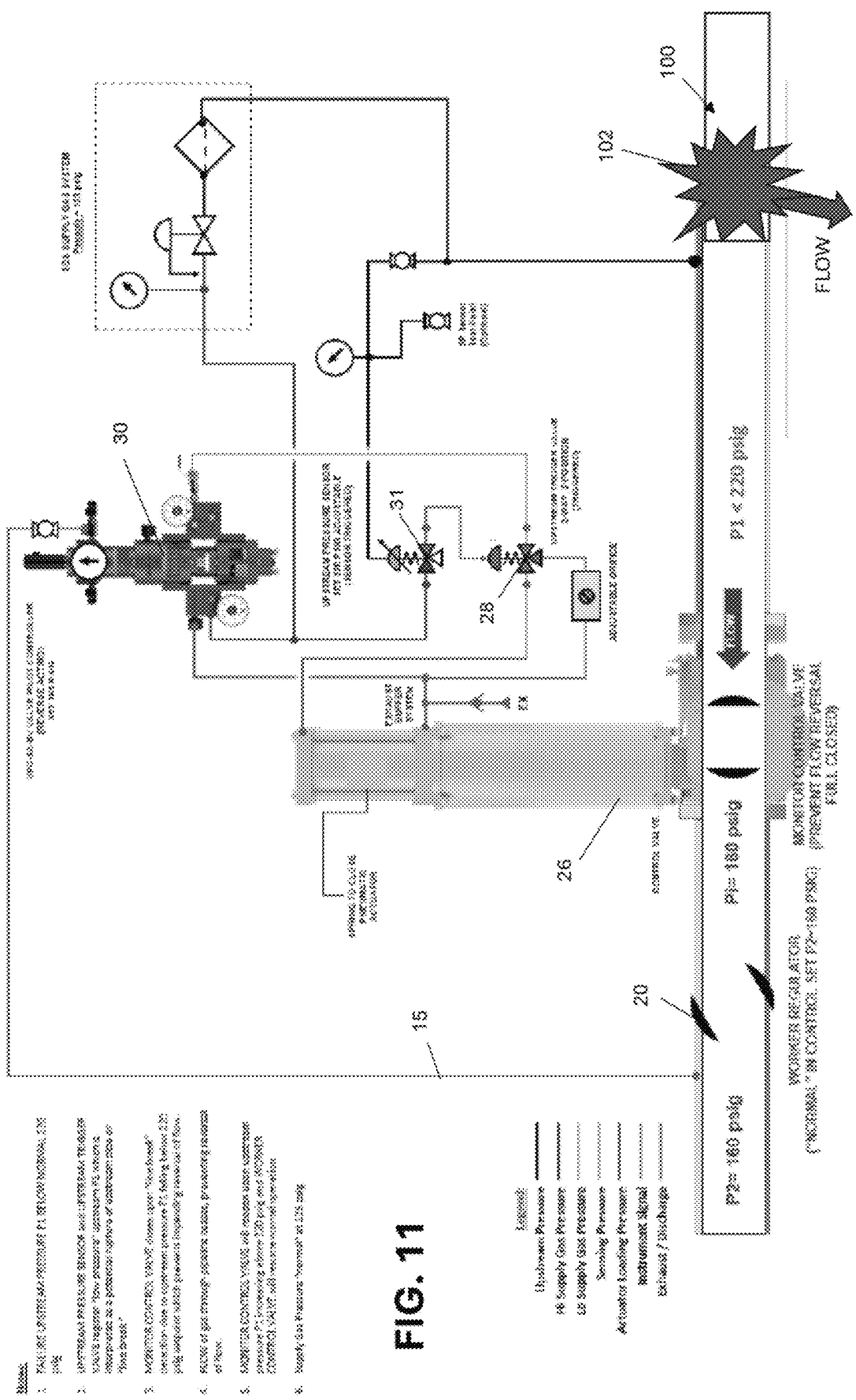
FIG. 11 illustrates the system of FIG. 9 showing operational changes after a pipeline rupture upstream with backflow prevention logic of the monitor control valve in a full-closed position.

For example, with respect to FIGS. 9-11, the control system 10 maintains the set pressures, P1 and P2, by continuously monitoring both pressures. The upstream (supply side) pressure setpoints (i.e., 230 min. and 500 max.) are set at sensor 31, which continually reads pressure on the upstream supply side of the monitor control valve 26. Pressure controller 30 monitors P2 via line 15, as shown—worker valve/regulator 20 also receives pressure feedback via line 17 of FIG. 8. As P2 drops below a minimum setpoint, worker valve/regulator 20 is actuated to open to allow P2 to increase. Conversely, as P2 rises, worker valve/regulator 20 throttles flow to bring P2 back to 160 psig. When P1 is within the setpoint limits and P2 is at 160 psig, normal operation of the worker valve 20 occurs and the monitor valve 26 is at full-open position.

As can be seen in FIG. 9, the system 10 is in normal operation. The worker regulator 20 is used to reduce delivery side pressure of the preferred "normal" upstream pressure (P1) from 230-500 psig to a preferred "normal" downstream delivery pressure (P2) of 160 psig. The monitor control valve 26 is in a full-open position (default), allowing the worker valve 20 to control flow pressure.

Referring now to FIG. 10, the schematic illustrates control failure of the worker valve/regulator 20. The failure of the worker valve 20 allows excess pressure in the downstream flow (i.e., delivery side) to reach a level greater than the preferred "normal" 160 psig. If allowed to continue, this scenario with reach what is called an "over-pressure" condition. This can be dangerous to residences and businesses which may not be equipped to regulate such high gas pressures. To prevent further climbing of the downstream (P2) pressure, the VPC pressure controller 30 senses the downstream pressure increase and transmits this pressure to the monitor trigger valve 28. The upstream pressure sensor 31 also transmits the upstream pressure P1 to the 3-way trigger valve 28, which then acts on the monitor valve 26 as a result of the climbing P2, to throttle flow. This continues to bring P2 back to the targeted 160 psig.

A final scenario is illustrated by the embodiment of FIG. 11. Here the schematic presents a situation where an upstream event (e.g., a line rupture) 102 has caused a drop in upstream pressure (P1<220 psig). While the worker regulator 20 is operating normal (i.e., throttling gas flow) to maintain downstream pressure (P2) at the preferred 160 psig, the low and dropping upstream pressure will eventually cause a flow reversal in the gas line—i.e., backflow—when P1<P2 is achieved. The upstream pressure sensor 31, which is set to 220 psig—i.e., below the lowest preferred "normal" upstream pressure of 230 psig—is triggered and signals the pressure controller 30 and/or the trigger valve 28 which then sends a loading pressure to the monitor valve 26. The monitor control valve 26 is actuated to a full-closed position, thereby preventing reverse flow in the gas line 100.

The control valve 26 is able to close much earlier than a check valve of the prior art (see FIG. 1), thereby preventing a greater loss of product. The control valve 26 may be a pressure regulator but must have a guaranteed physical close to be used in the disclosed system 10.

The monitor control valve 26 used for the disclosed system 10 may be either a rotary control valve or a linear control valve as manufactured and sold by Assignee, VRG Controls, LLC. (see https://www.vrgcontrols.com/control-valves). Further, while all the embodiments illustrated are directed to a natural gas supply line, it should be understood that the principles of the invention can be more broadly applied to most any fluid delivery system where reverse flow presents an issue.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A gas supply line control system comprising:
a monitor control valve having an inlet, an outlet, and a mechanism capable of movement within a range between and including a fully open position and a fully closed position to control gas flow in the gas supply line, wherein gas flows from upstream to the inlet, to downstream through the outlet;
a first sensor positioned to determine a flow pressure upstream of the monitor control valve inlet;
a pressure controller responsive to a second sensor positioned to determine a flow pressure downstream of the monitor control valve;
a valve responsive to the first sensor and coupled to the pressure controller and the monitor control valve;
wherein the valve:
triggers full closing of the monitor control valve mechanism to prevent reverse gas flow when the first sensor determines an upstream pressure below a first predetermined value, and
triggers throttling of the monitor control valve mechanism in cooperation with the pressure controller to regulate gas flow when the second sensor determines a downstream pressure above a second predetermined value.

2. The gas supply line control system of claim 1, further comprising a worker control valve downstream of the monitor control valve.

3. The gas supply line control system of claim 2, wherein the worker control valve is responsive to a third sensor downstream of the worker control valve and upstream of the second sensor.

4. The gas supply line control system of claim 1, wherein the first predetermined value for upstream pressure is greater than 220 psig.

5. The gas supply line control system of claim 1, wherein the monitor control valve is a rotary control valve.

6. The gas supply line control system of claim 1, wherein the monitor control valve is a linear control valve.

* * * * *